Feb. 6, 1940.                K. BIRD                2,189,483
                          BASTING SCOOP
                       Filed April 14, 1937

INVENTOR.
KATHERINE BIRD
BY
ATTORNEY.

Patented Feb. 6, 1940

2,189,483

UNITED STATES PATENT OFFICE 2,189,483

BASTING SCOOP

Katherine Bird, Detroit, Mich.

Application April 14, 1937, Serial No. 136,867

1 Claim. (Cl. 65—28)

My invention relates to a new and useful improvement to a basting scoop adapted for use in basting roasts and the like. Experience has shown that when roasts are placed within a pan proportioned to their size, there is but an L-shaped slight space between the inner surface of the walls of the pan and the roast, so that it is quite difficult to reach into the pan and convey the juices from the bottom of the pan upwardly to spread over the top of the roast for basting purposes. The present invention provides a device which is so constructed and arranged that it affords a most efficient means for basting purposes permitting the lifting of the juices from the narrow space between the roast and the pan in maximum amounts at each operation.

It is another object of the invention to provide a basting scoop so arranged and constructed that it will, when operated, receive a maximum amount of the juices at each operation.

It is another object of the invention to provide a device of this class which is simple in structure, economical of manufacture, durable and highly efficient in use.

Another object of the invention is the provision of a device of this class, so constructed and arranged, that the basting operation may be performed without removing the roasting pan from the oven and without subjecting the one basting the roast to a likelihood of being burned.

Other objects will appear hereinafter.

The invention consists in the combination and arrangement of parts hereinafter described and claimed.

The invention will be best understood by a reference to the accompanying drawing which forms a part of this specification, and in which.

Figure 1:
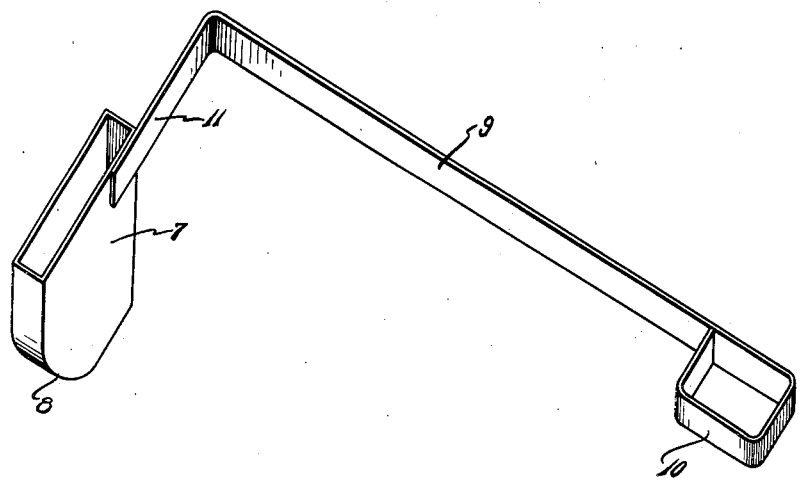
Fig. 1 is a perspective view of the invention.
Figure 2:
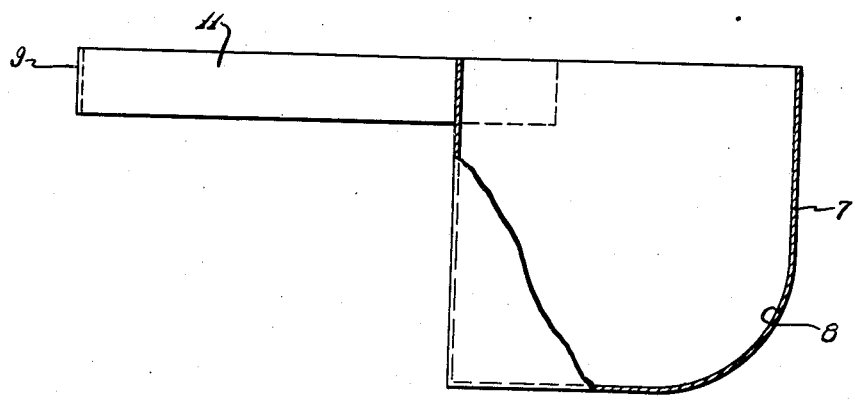
Fig. 2 is a side elevational view of the invention with a part broken away.

The invention comprises a hollow container 7, which is of scoop like or dipper form, having its forward bottom end rounded off to provide the round corner 8. It will be noted that this container 7 is very narrow and that it is provided with a handle having an elongated portion 9 terminating in an angularly turned hand 11 which extends parallel to the length of the container 7 and which proceeds outwardly from the container 7 at the upper end which is opposite to the edge having the rounded corner 8. The end of the handle portion 9 is doubled upon itself to provide the gripping portion 10.

Experience has shown that a basting scoop constructed in this manner is most efficient and that by having the corner 8 rounded a spilling of the juice while the device is being raised upwardly from its dipping position is reduced to a minimum, and a maximum amount of liquid may thus be raised out of a narrow space to be used for basting purposes.

It will also be noted that the scoop 7 is rectangular in cross section. It of course need not be rectangular but it is important that it be of a very narrow width and comparatively long and also deep.

While I have illustrated and described the preferred form of construction, I do not wish to limit myself to the precise details of structure shown but desire to avail myself of such variations and modifications as may come within the scope of the appended claim.

Having thus described my invention, what I claim as new and desire to secure by Letters Patent is:

A basting scoop comprising an L-shaped handle, an elongated narrow cup member secured to the terminal portion of the short arm of said handle and said cup member being narrow in the same direction as the longer arm of the handle to permit the cup member to be swung about said longer arm as an axis for basting purposes.

KATHERINE BIRD.